UNITED STATES PATENT OFFICE.

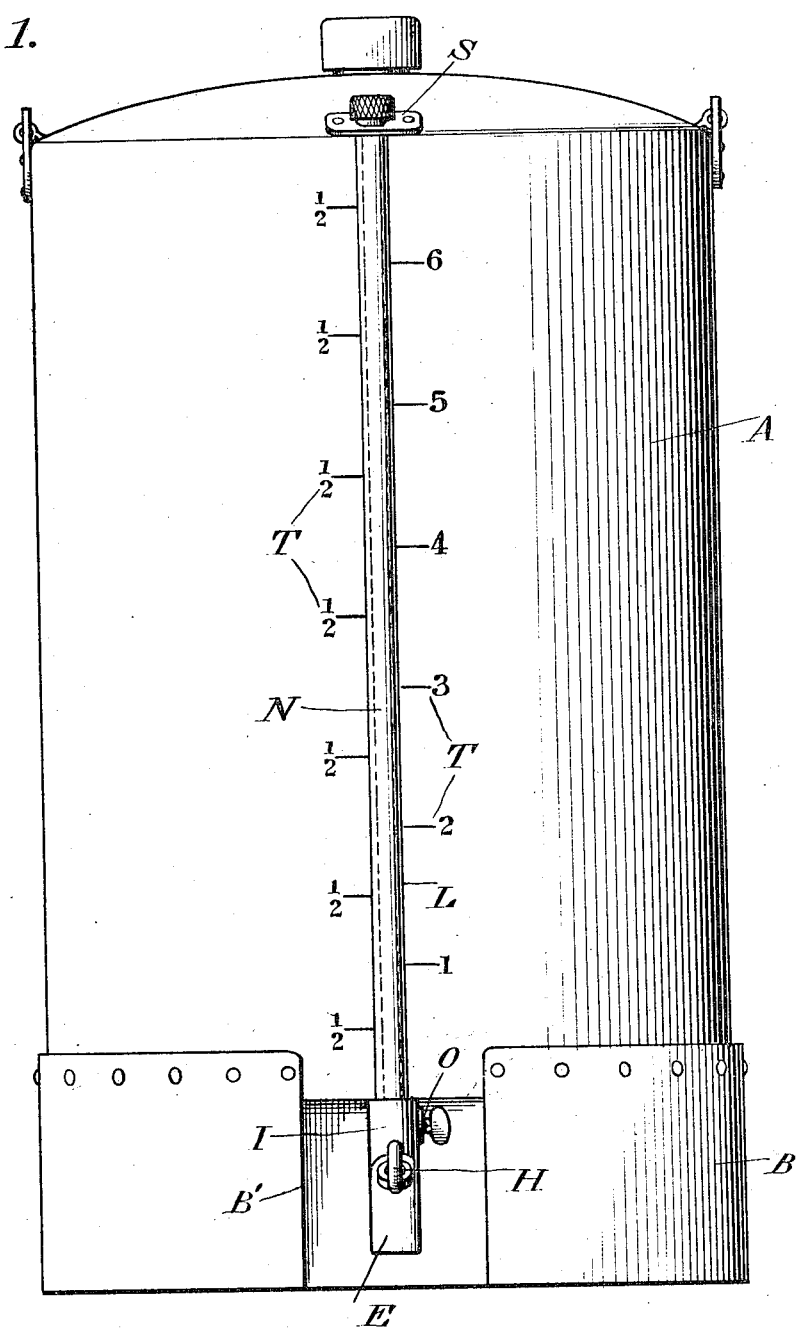

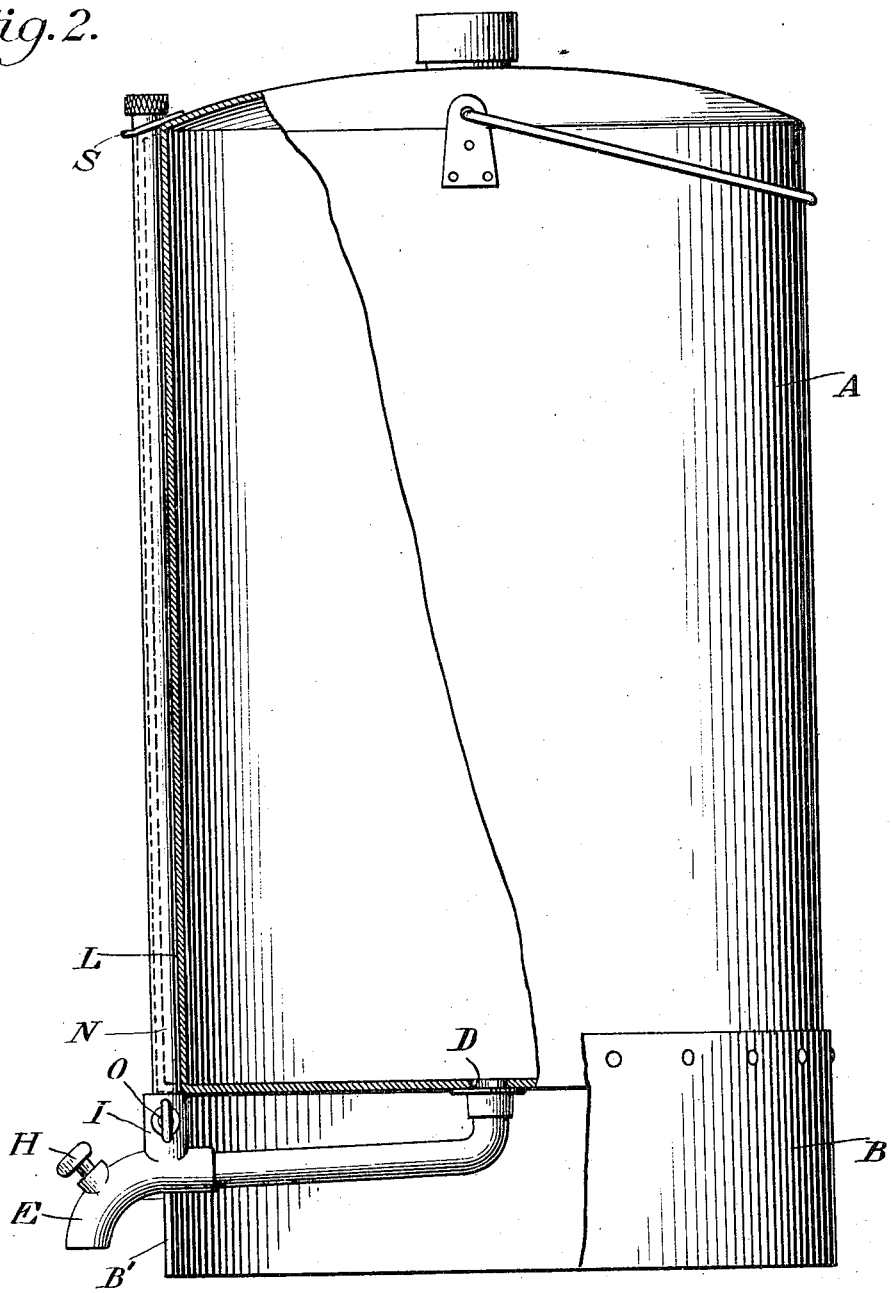

FERDINAND JOSEPH TRIIPE, OF SAN BERNARDINO, CALIFORNIA.

OIL CONTAINER AND REGISTER.

1,269,022.  Specification of Letters Patent. Patented June 11, 1918.

Application filed July 19, 1917. Serial No. 181,624.

*To all whom it may concern:*

Be it known that FERDINAND JOSEPH TRIIPE, a citizen of the United States, residing at San Bernardino, in the county of San Bernardino and State of California, has invented certain new and useful Improvements in Oil Containers and Registers; and he does hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in "oil and gasolene container and register" to designate the contents of a vessel.

My invention comprises various details of construction, combinations and arrangements of parts, which will be hereinafter fully described, shown in the accompanying drawings and then specifically defined in the appended claims.

My invention is illustrated in the accompanying drawings, which, with the letters of reference marked thereon, form a part of this specification and in which:

Figure 1 is a side elevation of the invention.

Fig. 2 is a central sectional view through the same.

Reference now being had to the details of the drawings by letter:

A designates a receptacle, which may be of any size or shape and has a support B with an opening B'. The bottom of the receptacle has a center opening D, and E is a spigot secured to said exit opening and extends through the opening B'. Valve H is mounted in said spigot and affords means whereby the supply of oil may be drawn from the receptacle. Said spigot has a socket portion I upon its upper edge which communicates with the interior of the spigot and N is a tube positioned in a vertical groove L formed in the receptacle and is preferably flush with the circumference of the latter. A valve O is mounted in the socket in which the lower end of the tube is positioned, and graduations T are formed along the marginal edges of the receptacle to designate the height the oil may rise in the tube and which will designate the height of the liquid within the receptacle. The apertured plate S is held at the top of the receptacle and through which said tube passes.

By the provision of an oil receptacle and registering means thereon, made in accordance with my invention, it will be noted that the quantity of liquid within the receptacle will show at all times in the tube, the liquid always rising to the height within the receptacle. In the event of the tube being broken, the valve O may be closed at the lower end of the tube, the plate swinging out, the broken parts removed and a new tube substituted therefor.

What I claim to be new is:

1. An oil container and register comprising a receptacle with a supporting base having a cutaway portion, a spigot fastened to and communicating with an exit opening in the bottom of the receptacle, said spigot having a socket portion communicating with the duct therein, a tube positioned in the latter and means upon the top of the receptacle for holding the tube in place, the circumference of the receptacle having graduations adjacent to the tube, as set forth.

2. An oil container and register comprising a receptacle with a supporting base having a cutaway portion, a spigot fastened to and communicating with an exit opening in the bottom of the receptacle, said spigot having a socket portion communicating with the duct therein, said receptacle having a vertical channel therein, a tube mounted in said channel and having its lower end seated in said socket, a valve regulating the supply of liquid leading into the tube and means upon the upper end of the receptacle for holding the tube in said channel.

3. An oil container and register comprising a receptacle with a supporting base having a cutaway portion, a spigot fastened to and communicating with an exit opening in the bottom of the receptacle, the latter having a channel formed therein, said spigot having a socket portion communicating with the duct therein, a tube mounted in said channel and having its lower end seated in said socket, an apertured plate pivoted to the top of the receptacle and adapted to hold said tube in the said channel and means for holding the plate in a fixed position as set forth.

In testimony whereof I hereunto affix my signature in presence of two witnesses.

FERDINAND JOSEPH TRIIPE.

Witnesses:
CHAS. E. VAHEY,
L. M. YOUNG.

Copies of this patent may be obtained for five cents each, by addressing the "Commissioner of Patents, Washington, D. C."